United States Patent [19]

Cliff

[11] Patent Number: 4,781,240

[45] Date of Patent: Nov. 1, 1988

[54] ENERGY EXCHANGE METHOD AND APPARATUS

[76] Inventor: John O. Cliff, 211 Deerfield La., Franklin, Tenn. 37064

[21] Appl. No.: 166,396

[22] Filed: Mar. 10, 1988

[51] Int. Cl.$^4$ .............................................. F28E 3/02
[52] U.S. Cl. .......................................... 165/1; 165/54; 165/111
[58] Field of Search ................. 165/111, 903, 54, 156, 165/1

[56] References Cited

U.S. PATENT DOCUMENTS 3,915,222 10/1975 Hull ...................................... 165/111

FOREIGN PATENT DOCUMENTS 6461 11/1986 PCT Int'l Appl. .................... 165/54
869355 5/1961 United Kingdom ................ 165/111

Primary Examiner—Albert W. Davis, Jr.
Attorney, Agent, or Firm—Abe Hatcher

[57] ABSTRACT

An air to air heat exchanger for ventilating buildings has the air streams maintained in direct contact with little mixing by tangentially introducing the air streams along cylindrical surfaces in opposite directions to form spiral, counterflows. Valves are provided to switch the flows for winter and summer operation.

16 Claims, 1 Drawing Sheet

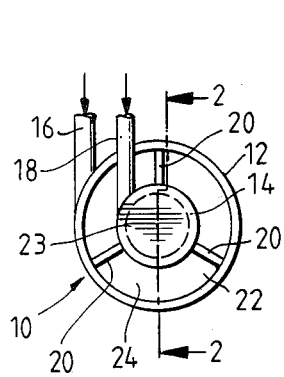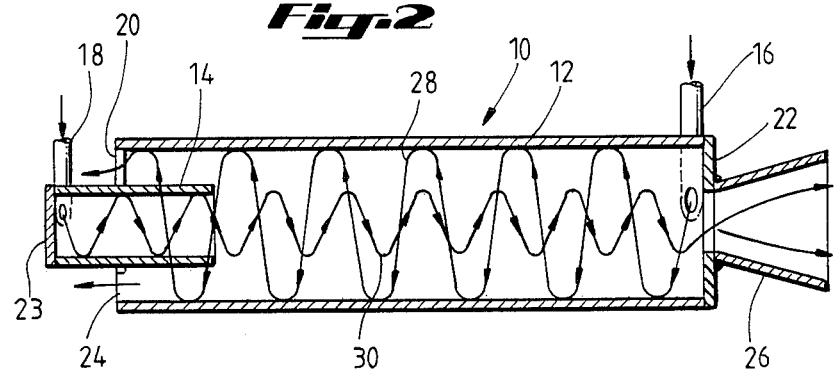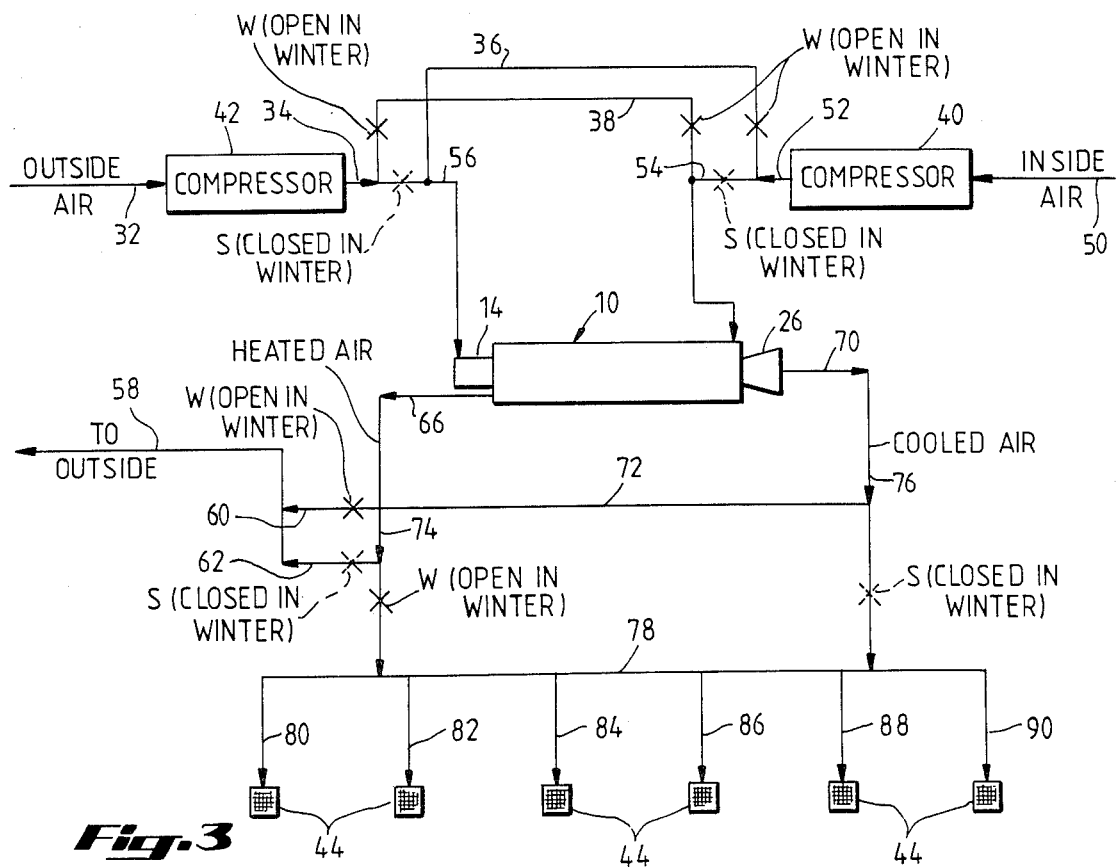

ENERGY EXCHANGE METHOD AND APPARATUS

BACKGROUND OF THE INVENTION

1. Field of the Invention

This invention relates to energy exchange. More particularly, it relates to a method and an apparatus for direct contact of one fluid with another to cool the one and heat the other.

2. Description of the Prior Art

A vortex tube has been used to create a stream of hot air and a stream of cold air from a single stream of compressed air. However, such splitting of a single stream in two has proved inefficient for most heat exchange applications and has been limited mainly to local cooling of machine parts.

SUMMARY OF THE INVENTION

After extended investigation I have found a method and an apparatus whereby a first stream of fluid may be passed countercurrently to a second in a limited zone in a manner such that the first stream leaves the zone warmer than it was at the start and the second leaves the zone cooler than it was at the start. The preferred fluid is air although other gases and liquids may be used according to the invention. The invention provides an allweather heating and cooling system and one that will move large volumes of air from inside to outside and from outside to inside so that dangerous buildups of radon and other contaminants inside buildings will be prevented. Such a system will be described hereinbelow in greater detail in connection with the description of the drawing which forms a part hereof.

I have found that by spiralling two streams of compressed air, each of which is at a substantially different temperature from the other, one radially inside the other, in opposite directions along a confined channel, preferably a cylinder, the stream to be heated being radially outside the other, and discharging the two streams at opposite ends of the channel, the outer stream will leave the channel warmer than it entered and the inner stream will leave the channel cooler than it entered. The stream leaving the channel cooler leaves through a nozzle at the end of the channel opposite where it originally enters from a channel of smaller diameter, preferably also a cylinder, into which it flows tangentially to cause the aforementioned spiralling. The stream leaving the channel warmer leaves peripherally at an open end into which is inserted part way along the axis of the larger channel an open end of the channel of smaller diameter, its opposite end being closed where the inner stream of fluid enters tangentially so as to remain inside the larger channel and assume its spiral pattern in direct contact with the outer stream in order to pass heat and energy thereto.

This direct contacting of two streams of air, the warmer inside the other, each in its own cylindrical channel, according to the invention permits an exchange of energy to the other to minimize energy loss and transfer of contaminants outside a structure.

BRIEF DESCRIPTION OF THE DRAWING

In the drawing,

FIG. 1 is an end elevation showing a direct energy exchange apparatus and how to contact two fluids therein with heat exchange between them and with very little mixing according to the invention.

FIG. 2 is a longitudinal section taken at 2—2 of FIG. 1.

FIG. 3 is a schematic illustration showing how to use an energy exchange unit according to the invention in cooling and heating a building.

DETAILED DESCRIPTION OF THE INVENTION

In FIGS. 1 and 2 of the drawing the stream to be heated of two streams of compressed fluid, preferably air, enters energy exchange unit 10 tangentially to its inner surface via conduit 16. The stream to be cooled enters inner, smaller tube 14 via conduit 18 at its closed end 23 tangentially and is guided spirally thereby. The stream to be heated takes a spiral path 28 guided by wall 12 of unit 10 as shown by arrows indicating the direction of flow from end 22 to end 20, where it leaves unit 10 at opening 24 warmer than upon entry after countercurrent contact with the inner stream which is cooled therby. The inner stream leaves unit 10 after being guided in an inner spiral path 30 to and through nozzle 26 by entry to unit 10 from the open end of inner tube 14, from which point countercurrent direct contact with the outer stream is maintained.

In FIG. 3 during the winter season air from outside a building enters compressor 42 via line 32 and is then introduced tangentially to heat exchange unit 10 via line 38 so as to begin a spiral pattern while at the same time air from inside the building enters compressor 40 via line 50 and is admitted tangentially to inner tube 22 at an opposite end of heat exchange unit 10 where it travels spirally in the opposite direction to that of the air from the outside in heat exchange relationship therewith. The air from outside which has been heated in heat exchange unit 10 by air from the inside is passed via lines 66, 74 and 78 through registers 80, 82, 84, 86, 88 and 90 into rooms of the building. Inside air cooled in energy exchange unit 10 is exhausted out nozzle 26 via lines 70, 72, 60 and 58 to the outside "w" indicates valves open during the winter heating cycle for the foregoing cycle to occur while "s" indicates valves closed during this cycle. In the summer, with valves "s" open and valves "w" closed, outside air enters compressor 42 via line 32 before being conducted via lines 34, 56 to enter the inner tube 14 tangentially while at the same time inside air, after entering compressor 40 via line 50, enters energy exchange unit 10 via lines 52, 54 tangentially at the end at which nozzle 26 is positioned and at the end opposite that at which the outside air enters. Heat exchange and work occur between the inside air and the outside air as the outside air spirals in a cylindrical channel continuing from the end of inner tube 14 (see 23 of FIG. 2) to the nozzle 26 end while the inside air passes countercurrently to the outside air in a spiral pattern or path limited by the cylindrical wall (see 12 of FIG. 2) of heat exchange unit 10. Substantially no mixing of the outside air with the inside air occurs despite the direct contact between the streams of each. The outside air which has been cooled by contact with and by performing work on the inside air in the heat exchange unit 10 is passed by way of lines 70, 76, 78, 80, 82, 84, 86, 88 and 90 through registers 44 to cool rooms inside the building. The inside air after heat exchange with the outside air and having work performed on it by the outside air is exhausted via lines 66, 74, 62 and 58 to the outside.

I have found that by the foregoing arrangement air contaminants may be transferred outside a building while exchanging energy to incoming air, thereby minimizing energy loss by air exchange. According to my invention a building may be positive-pressurized by oversizing the incoming air flow or by reducing the outflow by valving to minimize infiltration of contaminants such as radon.

Using a heat exchange unit such as that just described for a 2,000 square feet house, for example, with the heat exchange unit having a pressure increase of 5 psi and where the house temperature is 70 degrees Fahrenheit at an atmospheric pressure of 14.7 psia, 16,000 cubic feet of air are withdrawn from the house with a volume flow rate giving a complete air exchange every six hours and having a power requirement of approximately 0.87 horsepower and a 30-degree Fahrenheit change of temperature due solely to work done on and by the fluids, here air.

With the same conditions as those just stated except for only one psi pressure drop across the system, the power required is only 104 foot pounds per second or 0.189 horsepower, and the temperature drop/rise due solely to the work done on and by the fluids is about 6 degrees for equal amounts of air exhausting from and being introduced into the house. The additional temperature difference between the two streams results in increased energy exchange.

More than one heat exchange unit may be employed in the system illustrated schematically in FIG. 3 and described hereinabove.

While the invention has been described in terms of preferred embodiments, the claims appended hereto are intended to encompass all embodiments which fall within the spirit of the invention.

Having thus described my invention and certain preferred embodiments thereof, I claim:

1. A process for heat and energy exchange which comprises introducing compressed fluid from a first source to be heated into a first tube tangentially to an inner surface thereof at one end of said tube, conducting it along said tube to an opposite end of said first tube in a spiral manner, conducting compressed fluid from a second source to be cooled tangentially into a second tube at said opposite end of said first tube, said second tube being of less diameter than said first, and conducting said compressed fluid to be cooled in a spiral manner from said opposite end to said one end with direct contact between the two fluids and with very little mixing, thereby while performing work transferring heat from said fluid to be cooled to said fluid from said first source to be heated and making said fluid to be cooled cooler than when conducted into said second tube.

2. The process of claim 1 wherein said compressed fluid from said first source to be heated and said compressed fluid from said second source to be cooled comprise air.

3. The process of claim 2 wherein control valves are employed whereby, in the winter, said air to be heated comprises air from outside a structure and said air to be cooled comprises air from inside said structure, and, in the summer, said air to be cooled comprises air from outside said structure and said air to be heated comprises air from inside said structure.

4. A process for heat and energy exchange which comprises introducing a first stream of compressed fluid tangentially into an end portion of a first confined zone, conducting it within said zone spirally toward an opposite end portion thereof, introducing a second stream of compressed fluid to be cooled tangentially into a second confined zone of smaller diameter than the diameter of said first zone, said second confined zone being positioned axially within said first zone at said opposite end portion of said first zone and conducting said second stream of compressed fluid toward said end portion of said first confined zone in a spiral manner in direct contact with said first stream as it is conducted toward said opposite end portion with very little mixing of said first and second streams, thereby transferring heat and energy from said second stream to said first stream and increasing the temperature of said first stream while decreasing the temperature of said second stream.

5. The process of claim 4 wherein said first and second streams comprise air.

6. The process of claim 5 wherein the air stream to which said heat and energy are transferred is used for heating.

7. The process of claim 6 wherein the first air stream, to which heat is transferred, prior to being compressed, comes from outside and is used to heat a building and the second stream, from which heat is transferred, is exhausted from the building, thereby exchanging energy to said first air stream to minimize energy loss.

8. The process of claim 5 wherein the air stream from which heat and energy are transferred is used for cooling.

9. The process of claim 8 wherein the air stream from which heat is transferred, prior to being compressed, comes from outside a building and is used to cool the building, the second stream, to which heat is transferred is exhausted from said building, and the air stream coming from outside the building is oversized, thereby minimizing infiltration of contaminants.

10. A process for heat and energy transfer which comprises introducing a first stream of compressed fluid tangentially into a first tubular channel at one end thereof, introducing a second stream of compressed fluid to be cooled tangentially to a second tubular channel of smaller diameter than said first at an opposite end of said first and axially within said first for at least a part of the length of said first, flowing said first stream spirally around said second stream in direct contact therewith and with very little mixing therewith from said one end of said first tubular channel to said opposite end and exhausting said first stream from said opposite end while passing said second stream spirally within said first and in contact therewith and without mixing therewith from said opposite end of said first tubular channel to said one end thereof and exhausting said second stream at said one end of said first tubular channel, said first stream being substantially warmer when exhausted than when introduced and said second stream being substantially cooler when exhausted than when introduced.

11. The process of claim 10 wherein said first and second streams comprise air.

12. The process of claim 11 wherein said first stream when exhausted substantially warmer than when introduced to said first tubular channel is conducted into a building when the temperature inside said building falls below a preset point and said second stream when exhausted substantially cooler than when introduced is conducted into said building when the temperature inside said building rises above a preset point.

13. The process of claim 12 wherein the building is positive pressurized to minimize infiltration of contaminants.

14. A process for heat and energy exchange which comprises
    (1) introducing compressed air of one temperature into a first tube tangentially to the inner surface thereof at one end thereof,
    (2) passing said air inside said first tube in a peripheral spiral pattern to an opposite end of said first tube,
    (3) while said compressed air of one temperature is being introduced into said first tube and passed to said opposite end thereof, introducing at an end of said first tube opposite said one end compressed air of a different temperature to be cooled tangentially to the inner surface and at a closed end of a second tube inserted axially within said first tube at least part way along the length of said first tube, and
    (4) passing said air introduced to said second tube, to be cooled, in an axial spiral path to said one end of said first tube and out through a nozzle in said one end, thereby contacting said compressed air of said one temperature with compressed air of a different temperature from said second tube with very little mixing of the two, the temperature of the compressed air leaving said opposite end of said first tube being substantially warmer than that of said compressed air introduced into said first tube and the temperature of said compressed air passed out through said nozzle being substantially cooler than that of the compressed air intorduced into said second tube.

15. A process for energy exchange comprising conducting a first compressed fluid of a first temperature tangentially into a first cylindrically confined zone at a partially restricted open end thereof and forcing it in a spiral manner along the length of said zone toward an opposite end thereof, while said compressed fluid of said first temperature is being forced toward said opposite end conducting a second compressed fluid of substantially the same composition as the first and of a different temperature than the first tangentially into a second cylindrically confined zone having a closed end in the vicinity at which said second compressed fluid enters tangentially said second cylindrically confined zone and being of a smaller diameter than said first cylindrically confined zone, passing said second compressed fluid spirally axially within said first cylindrically confined zone and countercurrently to the direction of flow of said compressed fluid of a first temperature along the length of said first cylindrically confined zone and toward said one end thereof, withdrawing said compressed fluid of said first temperature from said opposite end of said first cylindrically confined zone at a temperature substantially higher than said first temperature and withdrawing said second compressed fluid from said one end of said first cylindrically confined zone at a temperature substantially lower than said different temperature.

16. The process of claim 15 wherein said first and second compressed fluids comprise air.

* * * * *